US009339998B2

(12) United States Patent
Aarts

(10) Patent No.: US 9,339,998 B2
(45) Date of Patent: *May 17, 2016

(54) APPARATUS AND METHOD FOR SEALING OR TYING PRODUCTS

(75) Inventor: Guido Maurinus Adriana Maria Aarts, Drunen (NL)

(73) Assignee: DuoSeal Automatics B.V., Drunen (NL)

( * ) Notice: Subject to any disclaimer, the term of this patent is extended or adjusted under 35 U.S.C. 154(b) by 174 days.

This patent is subject to a terminal disclaimer.

(21) Appl. No.: 13/883,383

(22) PCT Filed: Nov. 3, 2011

(86) PCT No.: PCT/NL2011/050748

§ 371 (c)(1), (2), (4) Date: Jul. 19, 2013

(87) PCT Pub. No.: WO2012/060702

PCT Pub. Date: May 10, 2012

(65) Prior Publication Data

US 2013/0292271 A1 Nov. 7, 2013

(30) Foreign Application Priority Data

Nov. 4, 2010 (NL) ..................................... 2005625

(51) Int. Cl.

*B65B 13/00* (2006.01)
*B32B 37/12* (2006.01)
*B65B 27/10* (2006.01)

(Continued)

(52) U.S. Cl.

CPC ............. *B32B 37/12* (2013.01); *B32B 37/0076* (2013.01); *B65B 27/105* (2013.01); *B65B 51/065* (2013.01); *B65B 67/06* (2013.01);

(Continued)

(58) Field of Classification Search

CPC ...... B65B 51/06; B65B 51/065; B65B 13/02; B65B 13/04; B65B 13/06; B65B 13/18; B65B 13/183; B65B 13/20; Y10T 156/1343

USPC ............. 53/399, 582, 583; 156/172, 184, 355

See application file for complete search history.

(56) References Cited

U.S. PATENT DOCUMENTS 2,841,935 A 7/1958 Krueger
4,545,185 A 10/1985 Chikatani
5,295,345 A * 3/1994 Ter Haar ......................... 53/583

FOREIGN PATENT DOCUMENTS

JP 11091730 A * 4/1999 ............. B65B 51/08
NL 8801612 A 1/1990
NL 8902097 A 3/1991

OTHER PUBLICATIONS

Int'l Search Report issued Apr. 18, 2012 in Int'l Application No. PCT/NL2011/050748.

*Primary Examiner* — Carson Gross

(74) *Attorney, Agent, or Firm* — Panitch Schwarze Belisario & Nadel LLP

(57) ABSTRACT

Apparatus for sealing or tying products, comprising a housing (2) with at least a first tape dispenser (3) and a star wheel (4), a slot (5) defined by or through the housing, wherein the star wheel extends at least partly in said slot, wherein the star wheel comprises a series of first cells (19) and a series of second cells (20), the first and second cells being intermittently disposed the star wheel, each cell being open to a periphery of the star wheel and two opposite sides thereof, wherein an urging device is provided having at least one edge portion for urging at least one product to be tied into one of the cells, especially a first cell.

20 Claims, 12 Drawing Sheets

Figure 1:
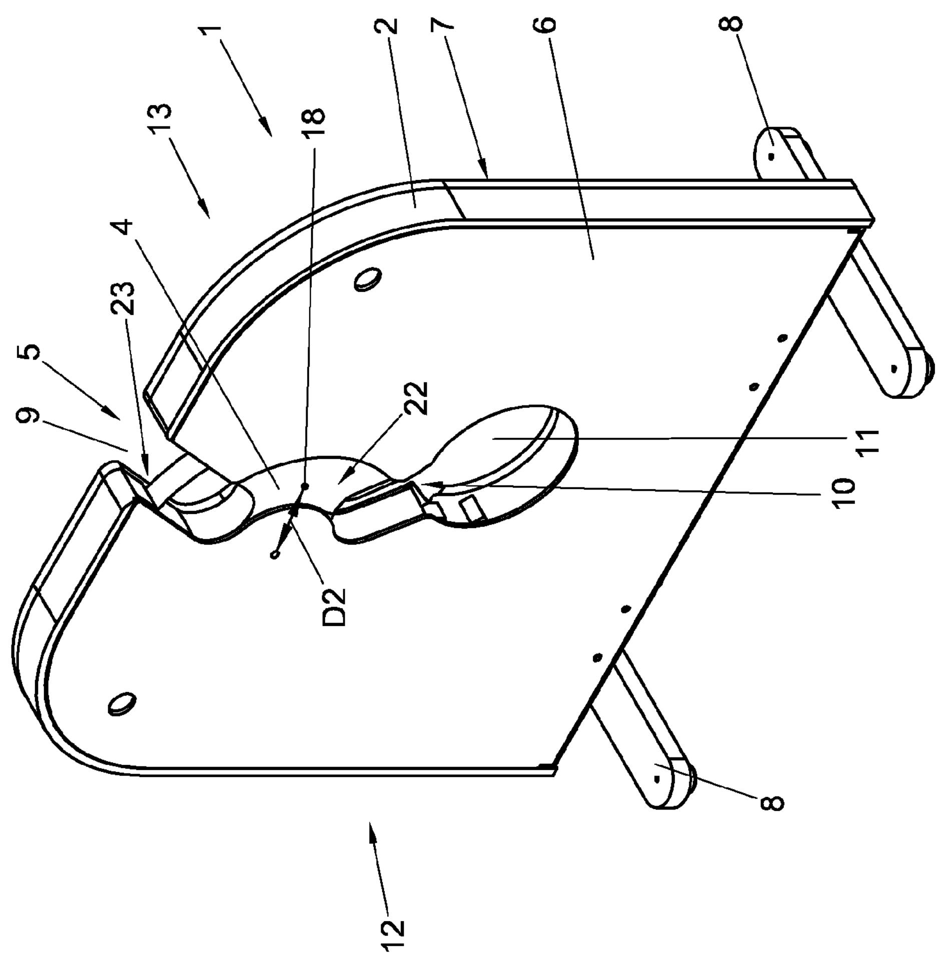

(51) Int. Cl.
*B65B 51/06* (2006.01)
*B65B 67/06* (2006.01)
*B32B 37/00* (2006.01)
*B65B 13/20* (2006.01)
*B65B 13/18* (2006.01)
*B65B 13/02* (2006.01)

(52) U.S. Cl.
CPC ................. *B65B13/02* (2013.01); *B65B 13/18* (2013.01); *B65B 13/20* (2013.01); *Y10T 156/1089* (2015.01)

APPARATUS AND METHOD FOR SEALING OR TYING PRODUCTS

CROSS-REFERENCE TO RELATED APPLICATION

This application is a Section 371 of International Application No. PCT/NL2011/050748, filed Nov. 3, 2011, which was published in the English language on May 10, 2012, under International Publication No. WO 2012/060702 A1 , and the disclosure of which is incorporated herein by reference.

The invention relates to an apparatus and method for sealing or tying products. The invention more specifically relates to an apparatus and method for wrapping at least an adhesive strip of tape around at least part of a bundle of products for tying them together.

It is known to gather a bundle of products such as produce, for example flowers, and wrap an elastic band around part of said products, such as around the stems of the flowers, in order to bundle them. It is also known to gather such products into a bundle and then wrap an adhesive tape around part of them, such as around the stem of a bundle of flowers, for bundling them. Such apparatus are for example known from U.S. Pat. No. 2,841,935, NL8902097 and U.S. Pat. No. 4,545,185.

In U.S. Pat. No. 2,841,935 a sealer is shown having a wheel comprising a series of slots defined in the periphery thereof, regularly spaced relative to each other along said periphery. Between each set of two adjacent slots a knife is housed in the wheel, having a cutting edge extending slightly from said periphery. Tape fed over the periphery can be cut by such cutting edge when the wheel is turned during feed through of a bag to be closed and sealed.

In NL8902097 a sealer is shown having a star wheel having six identical slots provided evenly distributed around the periphery of the star wheel. Products can be hand fed though a slot in the housing of this sealer for rotating the wheel and sealing the bag.

In U.S. Pat. No. 4,545,185 a sealer with a star wheel is disclosed, wherein the star wheel has four first slots into which the neck of a bag to be sealed can be fed, and in the middle between two adjacent first slots a second slot is provided for allowing a knife to cut tape fed over the periphery of the wheel.

An aim of the present invention is to provide an alternative to these known apparatus and methods. Another aim of the present invention is to provide a method and apparatus for sealing or tying products into bundles. A still further aim is to provide a method and apparatus for tying fresh produce, flowers or the like natural products.

One or more of these and/or other aims can be obtained with an apparatus and/or method according to invention.

An apparatus for sealing or tying products can comprise a housing with at least a first tape dispenser and a star wheel. A slot can be defined by or through the housing, wherein the star wheel extends at least partly in said slot. The star wheel comprises a series of first cells and a series of second cells, the first and second cells being intermittently disposed in the star wheel, each cell being open to a periphery of the star wheel and two opposite sides thereof. An urging device is provided having at least one edge portion for urging at least one product to be tied into one of the cells, especially a first cell.

A method for sealing or tying products can be characterised by adhesive tape which is led over an open side of a cell of a star wheel, an adhesive side of the star wheel facing away from the star wheel. A product or a bundle of products is pushed against the tape and into the cell, adhering at least part of the adhesive tape around at least part of the product or bundle of products, and rotating the star wheel around an axis. The cell with the product or bundle of products is preferably moved along a feeding station for feeding a second tape, preferably non adhesive tape, over the cell and the product or bundle, adhering to the adhesive tape. The star wheel is rotated, tying the tape round the product or the bundle of products, wherein the star wheel is rotated further and the tape is or the two adhered tapes are cut, allowing the bundle to be removed from the cell. The product or bundle of products is pushed into and held in the cell by an urging device and/or a pressing device.

Use of a sealer with a star wheel, an adhesive tape dispenser and a tape dispenser for a second tape, easier tearable than the adhesive tape can be described, for binding products, especially fresh produce, wherein adhesive tape is dispensed form the dispenser and wound around at least part of a bundle of products using the star wheel. There after a second tape is adhered to the adhesive tape, such that ends of the adhesive tape are covered by the second tape and do not adhere to each other. The bundle of products is pushed into and temporarily held in the cell by an urging device and/or a pressing device.

A bundle of products, especially obtained with a method, use or apparatus as described can be provided, which bundle is provided around part thereof with a piece of adhesive tape, binding the bundle together. Preferably a piece of a second tape, easier tearable than the adhesive tape, is provided to both ends of said piece of adhesive tape, extending over an interface where parts of the adhesive tape are interconnected and/or over a part of the bundle extending between said ends of said piece of adhesive tape. The bundle is tied by at least the tape, wherein a container or item is provided between the tape and the bundle of products.

Figure 2:
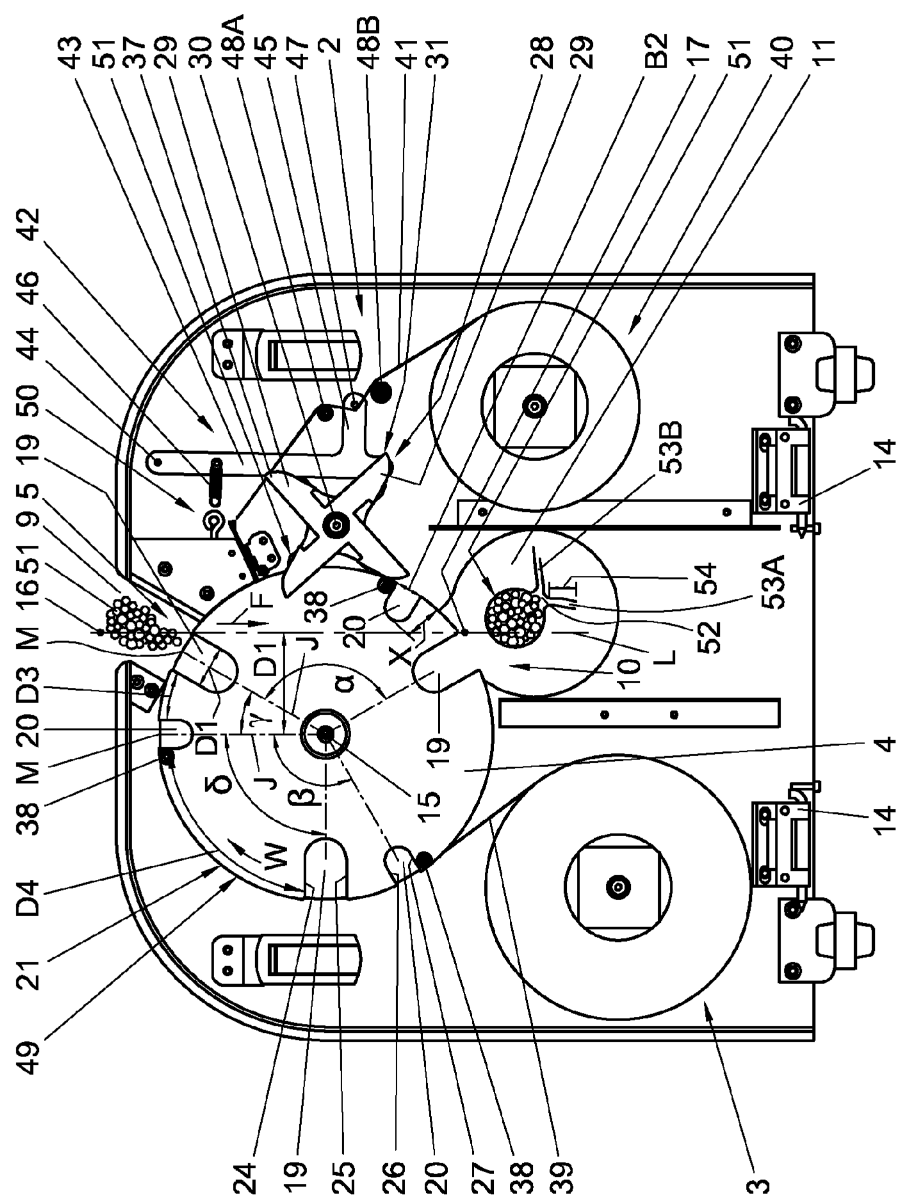
Figure 3:
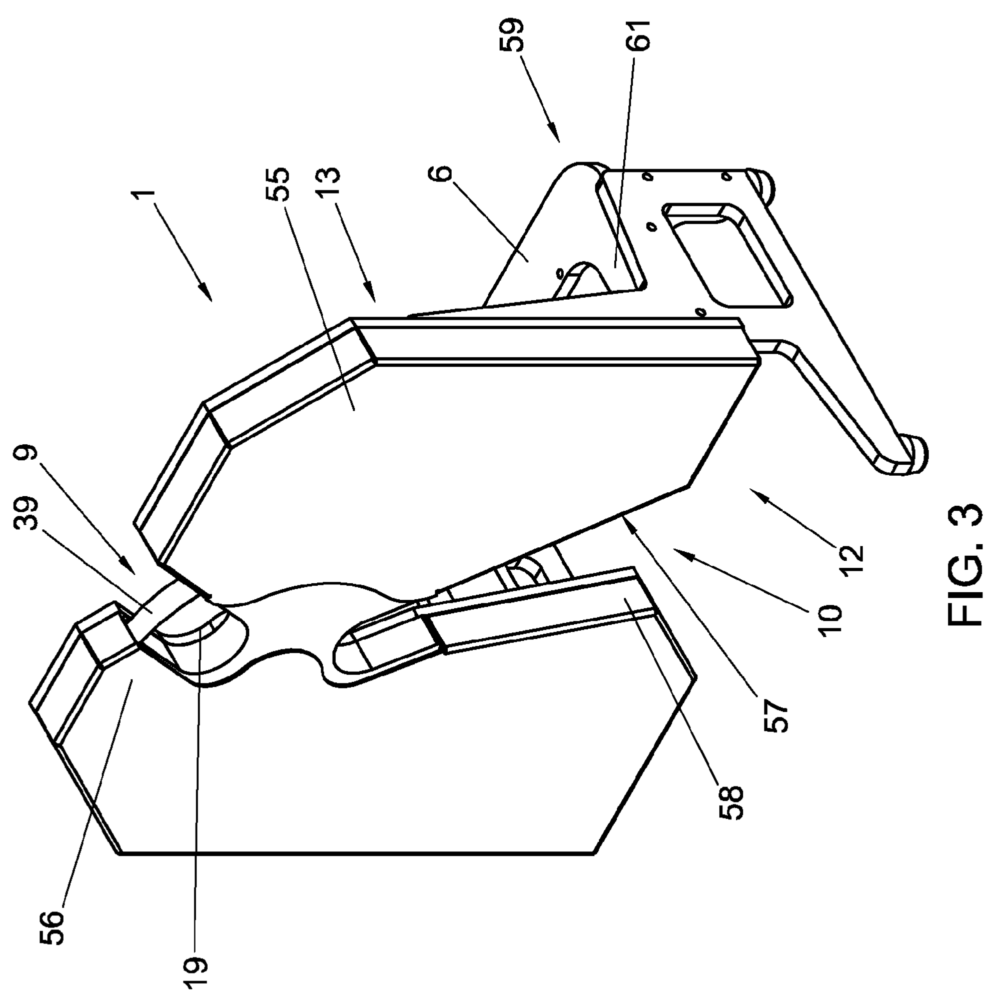
Figure 4:
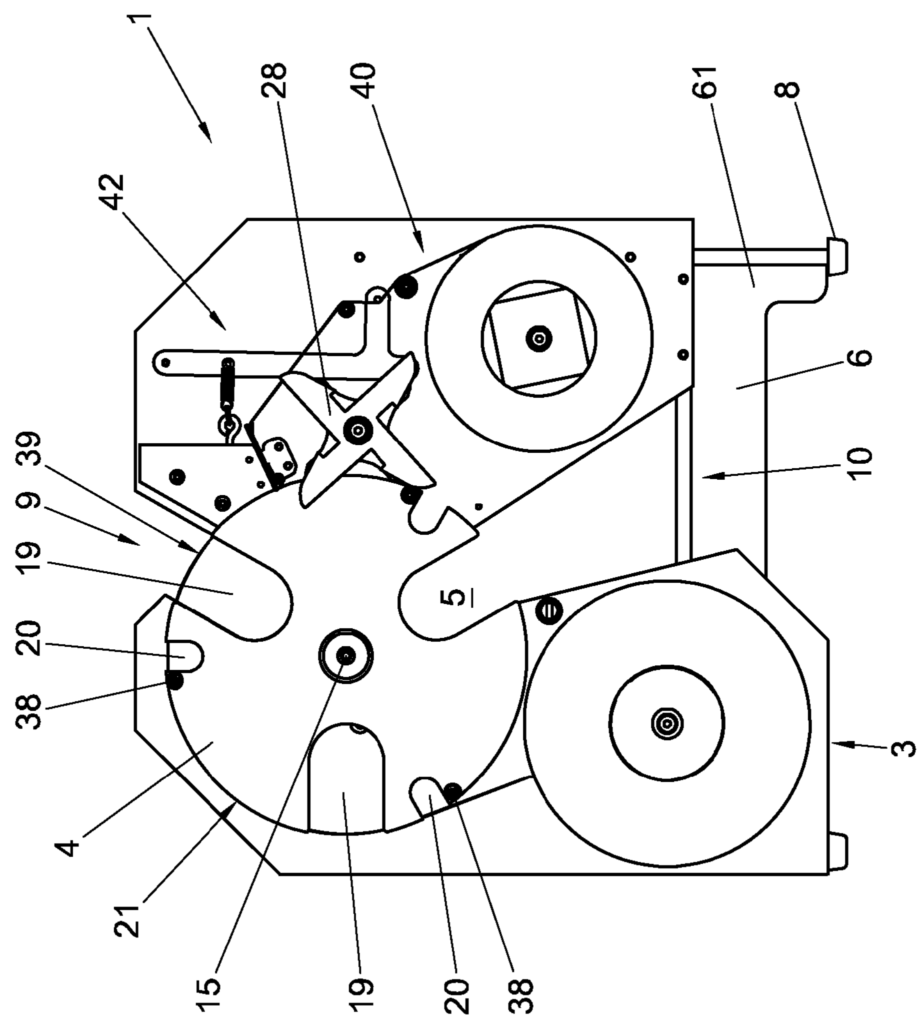
Figure 5:
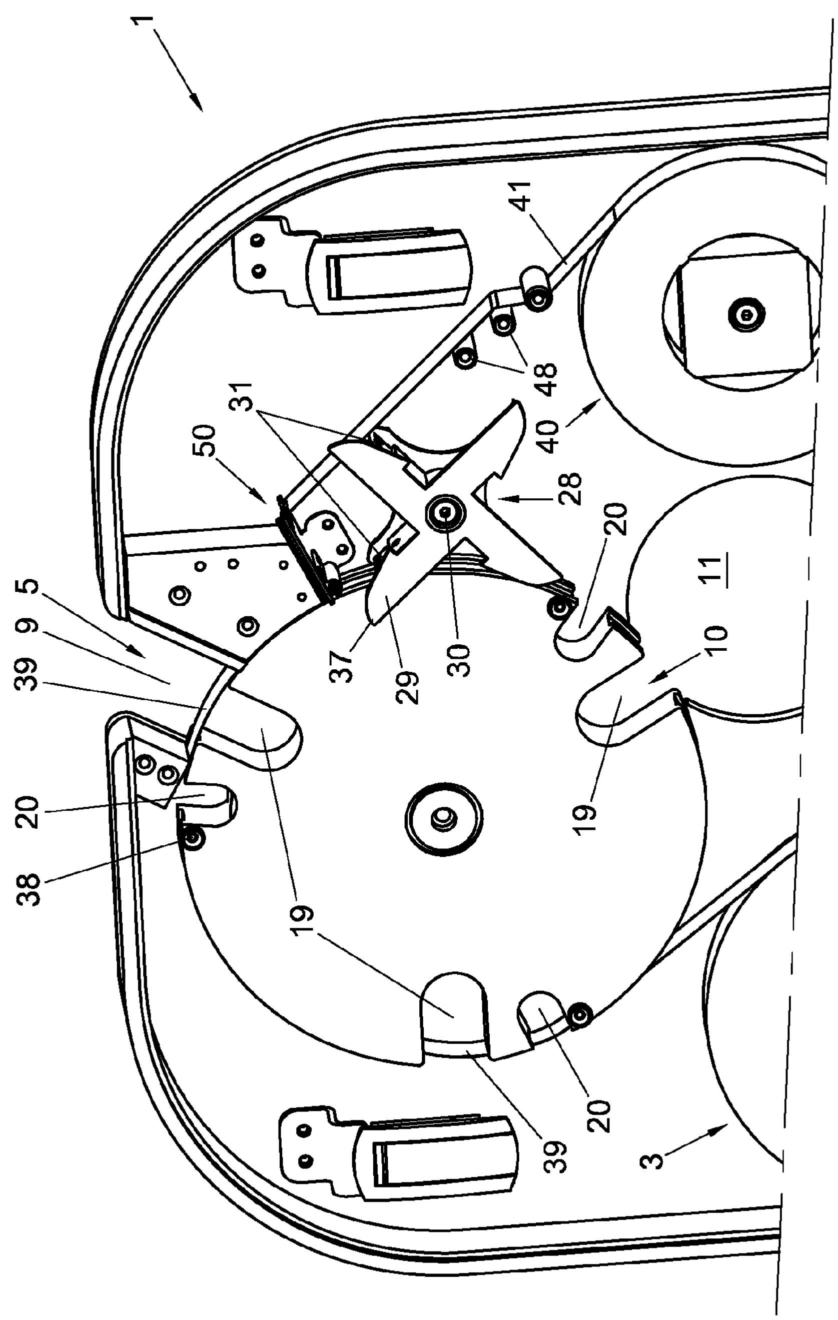
Figure 6:
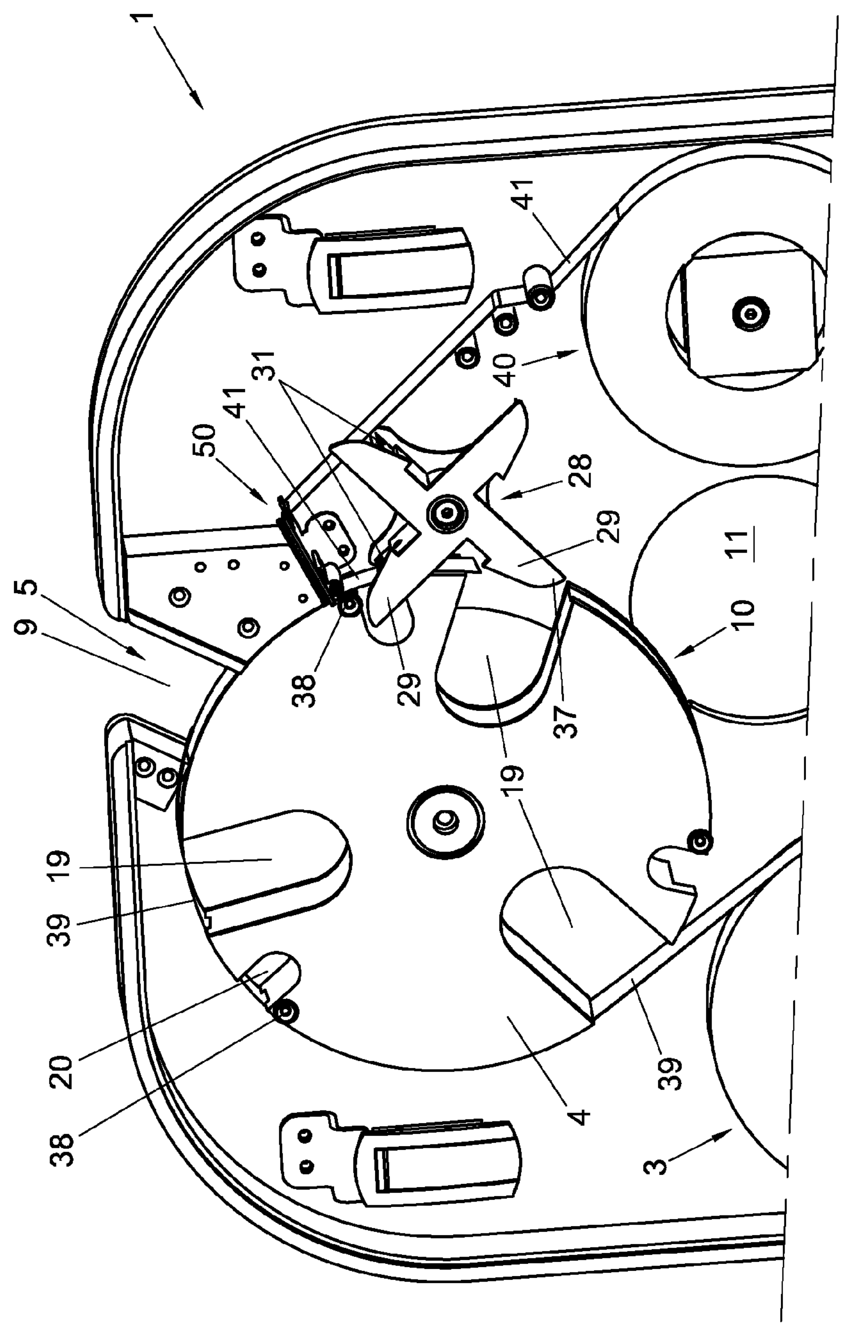
Figure 8:
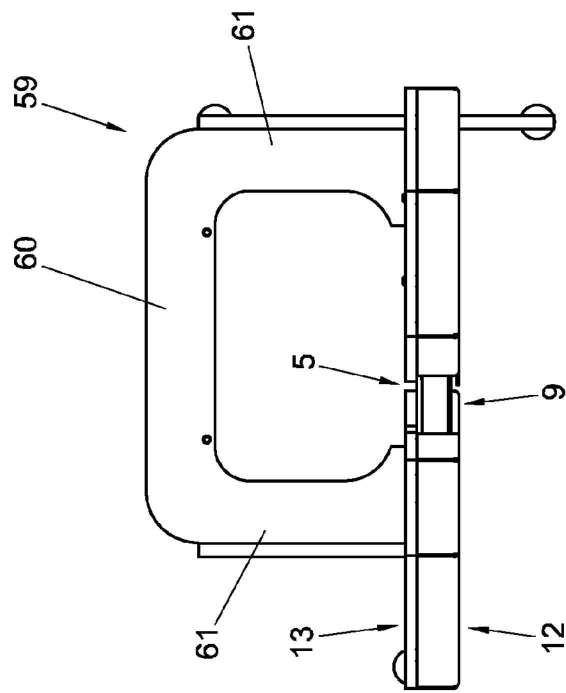
Figure 7:
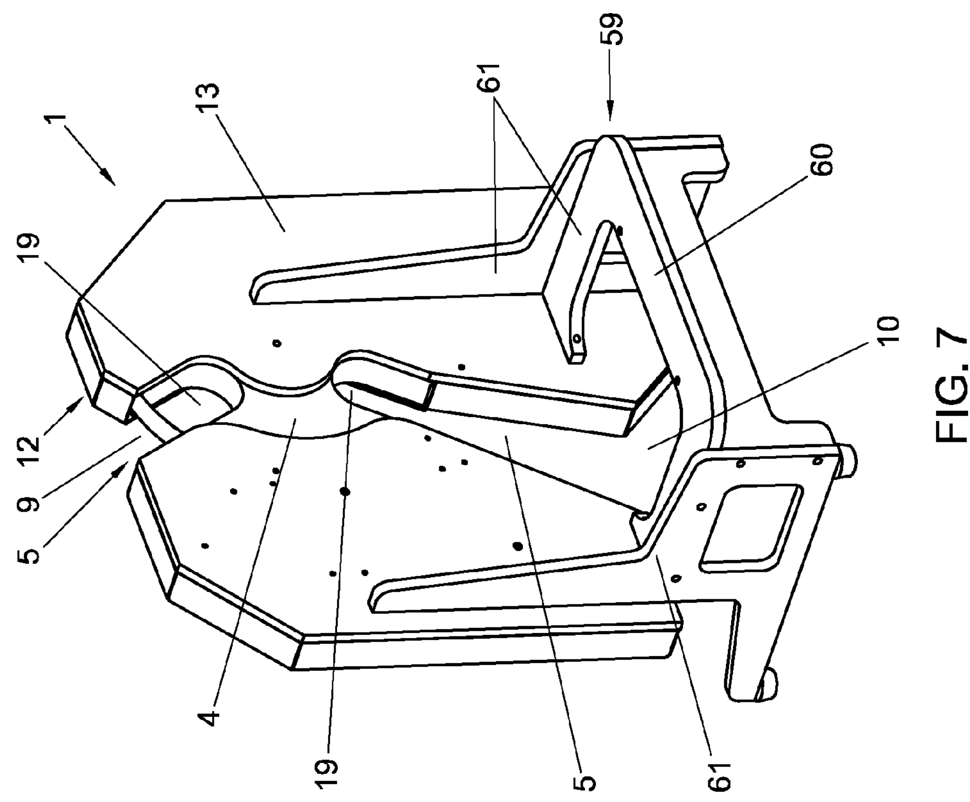
Figure 9:
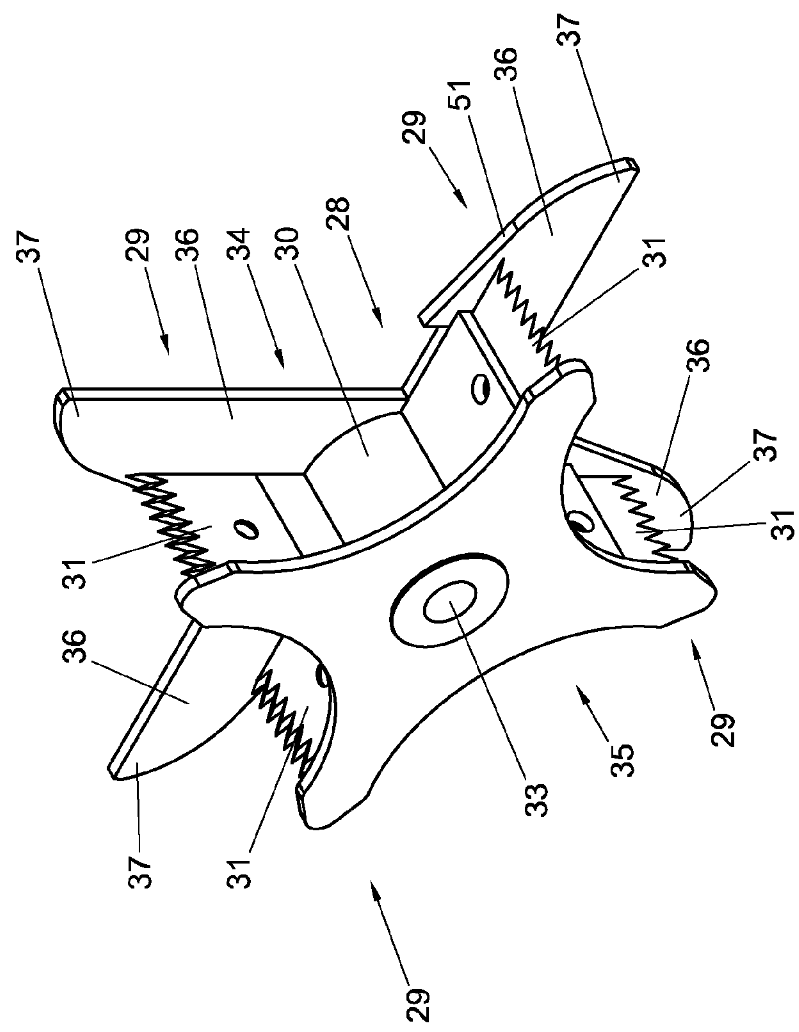
Figure 10:
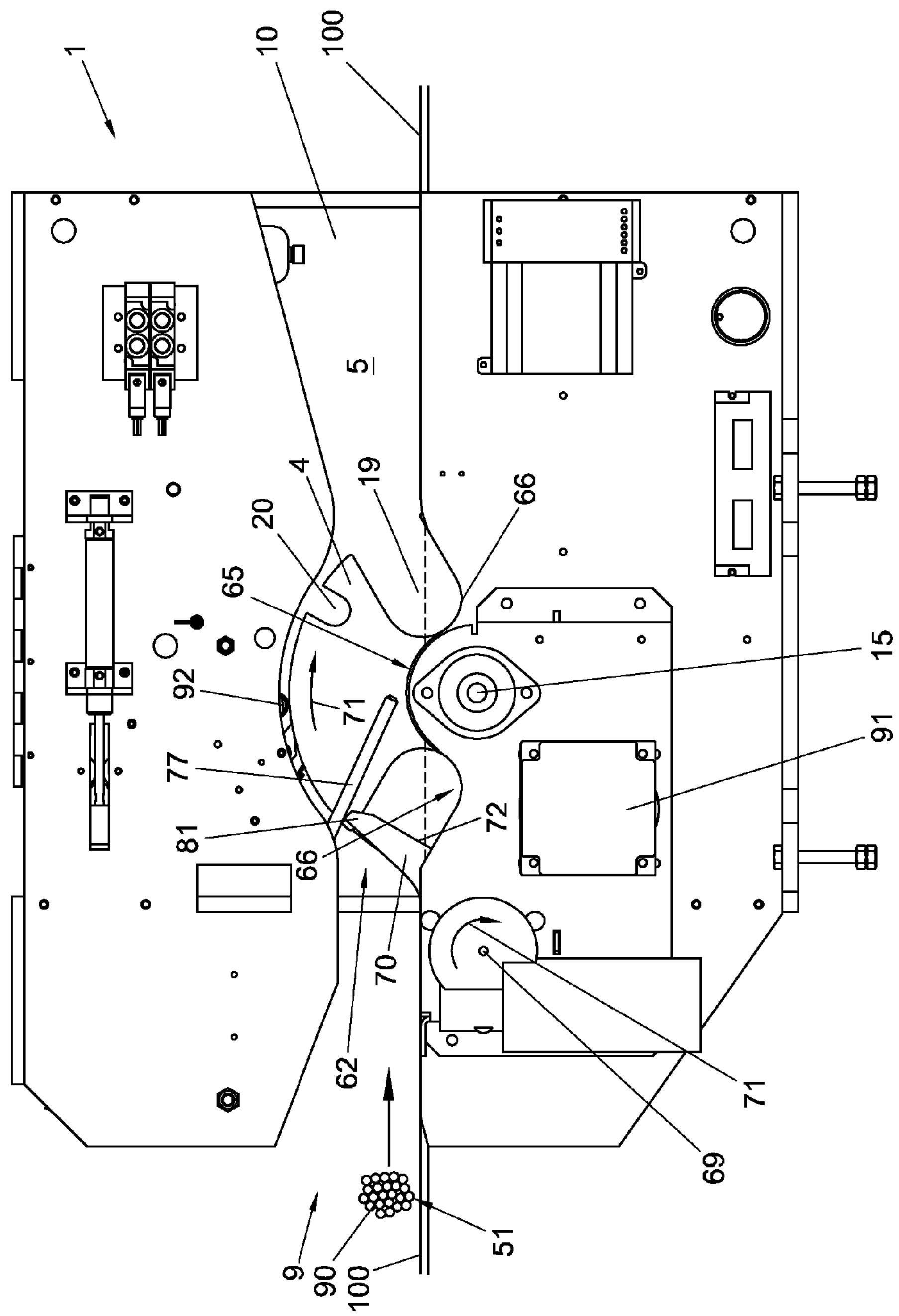
Figure 11:
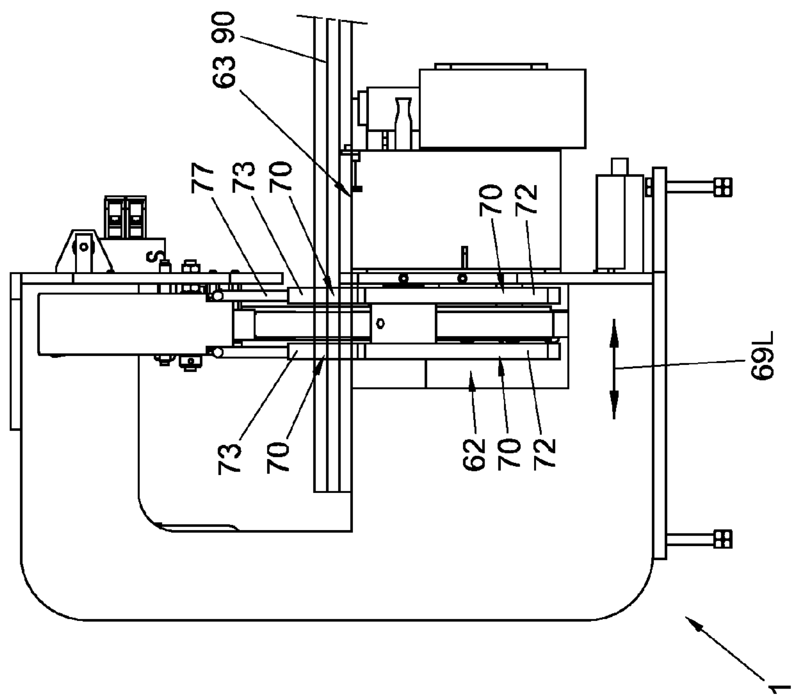
Figure 12:
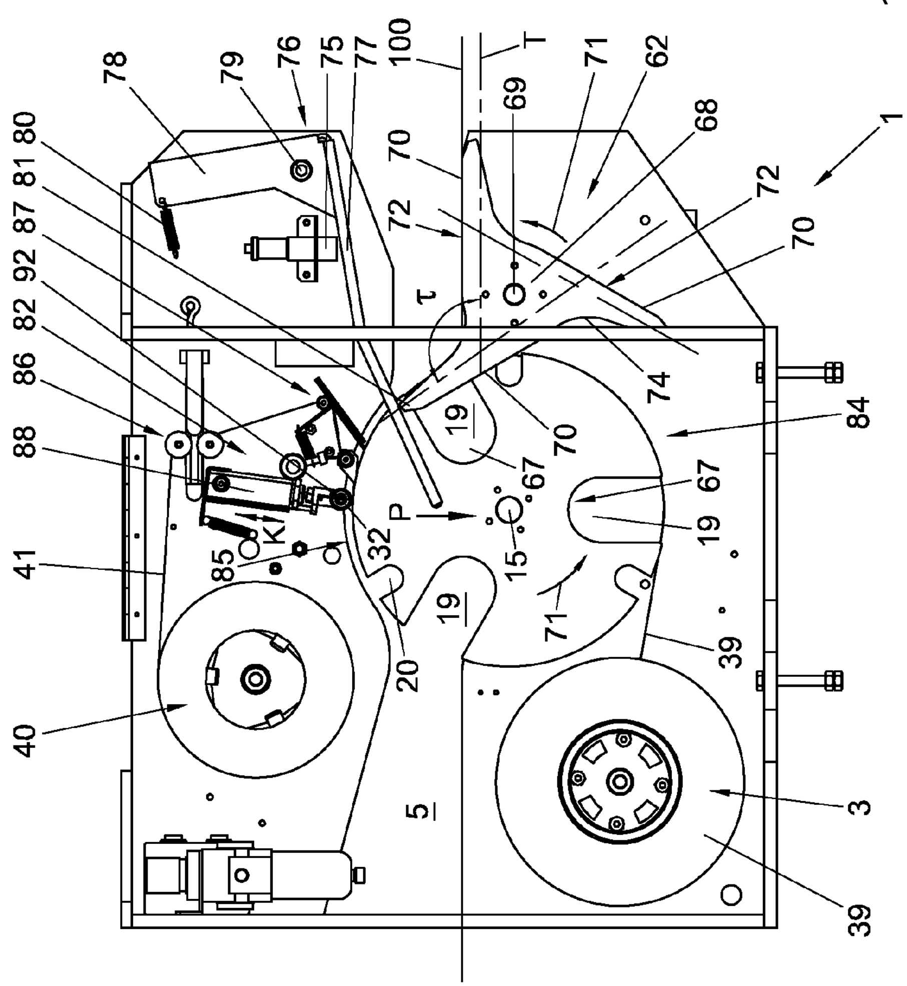
Figure 13:
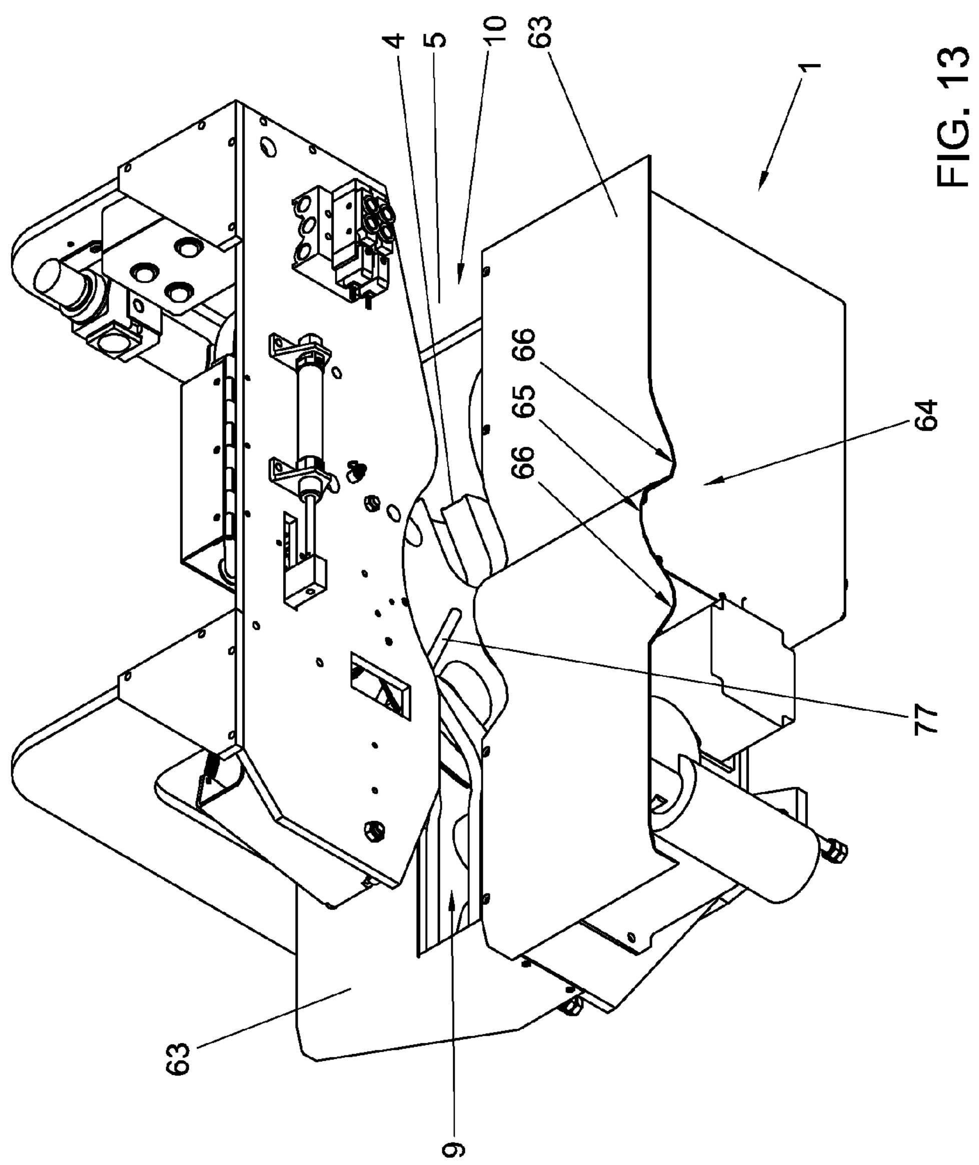

By way of example apparatus, methods, use and products shall be described hereafter, schematically and in relative detail, with reference to the drawing, in which:

FIG. 1 schematically in perspective view an apparatus of the present description, in a first embodiment;

FIG. 2 schematically in frontal view, opened, an apparatus of FIG. 1;

FIG. 3 schematically in perspective view an apparatus of the present description, in a second embodiment;

FIG. 4 schematically in frontal view, opened, an apparatus of FIG. 3;

FIG. 5 schematically part of an apparatus of FIG. 1 or 3, in a first position;

FIG. 6 schematically part of an apparatus of FIG. 1 or 3, in a first position;

FIG. 7 schematically in perspective view an apparatus of FIG. 3, from the rear;

FIG. 8 schematically in top view an apparatus of FIG. 7, with part of a bundle engaging the star wheel;

FIG. 9 schematically in perspective view a knife assembly;

FIG. 10 schematically in frontal view an apparatus, in a further embodiment;

FIG. 11 in side view an apparatus of FIG. 10;

FIG. 12 in rear view an apparatus of FIGS. 10 and 11;

FIG. 13 in perspective view an apparatus of FIG. 10-12; and

Figure 14A:
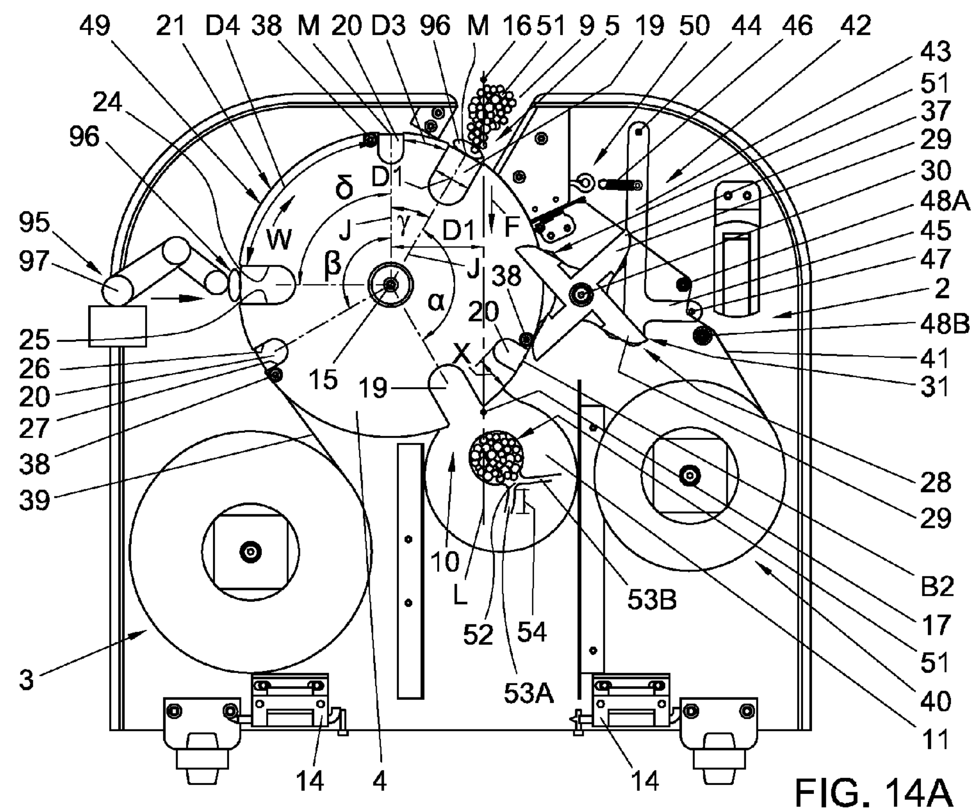
Figure 14B:
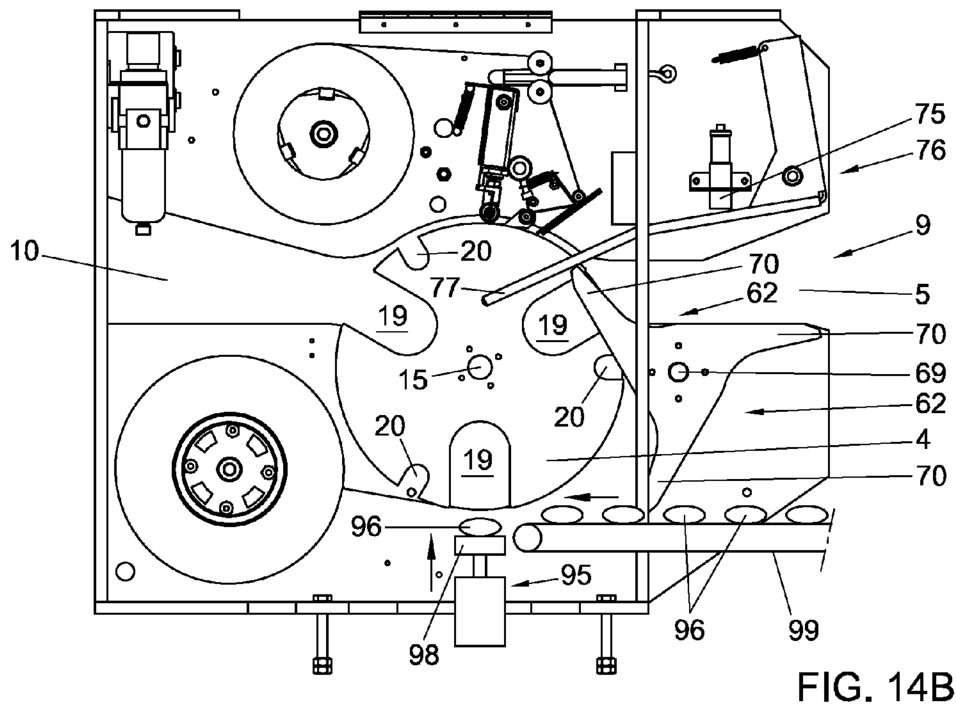

FIG. 14A-B the apparatus of FIG. 10-13, with a bundle of flowers, together with the supply of containers to be tied with the bundle.

In this description the same or similar or corresponding parts can have the same or corresponding reference signs. The embodiments shown and described are exemplary embodiments only and should by no means be understood as limiting the scope of protection sought as defined by the claims. The apparatus and methods according to the invention are described in relation to fresh products such as flowers, produce and the like, uncovered or covered. This should not be considered limiting. A similar apparatus could be used for for example sealing or tying bags, wrappings, bundles of other products, such as but not limited to rods, sticks and other such elements.

In this description a container can be described to be tied by the tape with the product or products. Such container can be for example be, but is not limited to, a sachet, bag, flask, box, bottle or any container suitable for holding content. Alternatively other items could be tied to a product or bundle of products in the same or similar manner. Such items are, for the purpose of this description, also to be understood as encompassed by the description.

In this description apparatus will described which are hand-operated, that is wherein products to be tied or sealed are fed through the apparatus manually. However, mechanical means can be provided to feed the products through the apparatus, or at least assist a user in feeding the products through the apparatus, such as transport bands, chains and other transport means. Star wheel should be understood as at least including any element, rotational around a real or virtual axis, provided with cells along the periphery forming positions for receiving products or parts thereof to be tied or sealed and/or receiving at least part of a knife or other cutting or slicing tool or element.

Relevant following first cell can be understood as meaning a first cell following the said first cell seen in a direction of rotation of the star wheel, which can be used for tying or sealing products.

FIGS. 1 and 2 show a first exemplary embodiment of an apparatus. The apparatus 1 comprises a housing 2, at least a first tape dispenser 3 and a star wheel 4. A slot 5 is defined by or through the housing 2. The star wheel 4 extends at least partly in said slot 5. In this embodiment the housing 2 comprises a front panel 6 and back panel 7 and rests on legs 8 for providing stability and the possibility of moving the apparatus 1 to an appropriate position. The apparatus can thus be mobile. However, it is also possible to install the apparatus permanently or semi permanently in one location, for example at a packaging line. In this embodiment the slot 5 extends from an inlet opening 9 to an outlet opening 10. The outlet opening 10 can be provided between the inlet opening 9 and the legs 8. In the embodiment of FIGS. 1 and 2 the outlet opening 10 opens into a hole 11 extending through the housing 2, opening to both the front 12 and back 13 thereof. The slot 5 is formed by cut outs in the front panel 6 and back panel 7.

In FIG. 2 the front panel 6 has been removed, for example pivoted down around pivots 14, opening the housing 2. As can be seen the star wheel 4 can be mounted on an axis 15, extending substantially perpendicular to the front and back 12, 13 of the housing 2, such that it can be rotated around said axis 15 within the housing 2. In an embodiment the inlet opening 9 and outlet opening 10 can be positioned such that a straight line L drawn between a mid 16 of the inlet opening 9 and a mid 17 of the outlet opening 10 extends past the axis 15 at a distance D1 there from. The slot 5 is curved between the inlet opening 9 and outlet opening 10 such that it passes the axis 15, a mid 18 thereof being at a distance D2 from the axis 15. The distance D2 can in an embodiment be larger than the distance D1. In other embodiments it can be smaller or the same.

The star wheel 4 comprises a series of first cells 19 and a series of second cells 20. The position of each cell 19, 20 is for the sake of this description defined by a line J extending through the axis 15 and a mid M of a relevant cell 19, 20 at the periphery 21. The first cells 19 and second cells 20 can be intermittently disposed in the star wheel 4. This has to be understood as including but not necessarily limited to an arrangement of the cells 19, 20 around the periphery 21 of the star wheel 4 such that between two adjacent first cells 19 seen around the periphery 21 a second cell 20 is provided. Each cell 19, 20 is open to the periphery 21 of the star wheel 4 and two opposite sides 22, 23 thereof. In the embodiments shown there is the same number of first cells 19 as there are second cells 20. In an embodiment there can be three first cells 19 and three second cells 20. In an embodiment the first cells 19 can be distributed around the periphery 21 evenly, as can the second cells 20. For three first cells 19 this means that an angle a included between two lines J through adjacent first cells 19 will be approximately 120 degrees. Similarly for three second cells 20 the angle $\beta$ included between two lines J through adjacent second cells 20 will be approximately 120 degrees. For different numbers of first and second cells 19, 20 the angles $\alpha$, $\beta$ will be amended accordingly, by the definition 360 degrees divided by the number of first or second cells 19, 20 respectively.

In an embodiment each first cell 19 comprises a leading edge 24 and a trailing edge 25, whereas each of the second cells 20 has a leading edge 26 and a trailing edge 27, seen in a direction of rotation W of the star wheel 4. A direction of rotation W of the star wheel 4 is defined by rotation of the star wheel 4 around the axis 15 such that a cell 19, 20 moves from near the inlet opening 9 to near the outlet opening 20 over the shortest path of travel, along the slot 5. In an embodiment a distance D3 between a trailing edge 25 of a first cell 19 and a leading edge 26 of an adjacent second cell 20, measured along the periphery 21 of the star wheel 4 is smaller than the distance D4 between the trailing edge 27 of said second cell 20 and a leading edge 26 of the same second cell 20 and a following relevant first cell 19. In an embodiment the distance D3 can be less than half the distance between two adjacent relevant first cells 19. In an embodiment the first and second cells 19, 20 can be distributed around the periphery such that the angles $\alpha$ and $\beta$ will be the same, but an angle $\gamma$ between lines J through a first cell 19 and an adjacent trailing cell 20, that is the second cell following the first cell 19 in the direction of rotation W of the star wheel 4 is smaller than the angle $\delta$ between the lines J through said second cell 20 and the following first cell 19. In an embodiment the angles $\alpha$, $\beta$ can be 120 degrees, the angle $\gamma$ can be between 5 and 60 degrees, more specifically between 10 and 45 degrees, for example approximately 30 degrees. The angle $\delta$ can be about ($\alpha$-$\delta$), which can e.g. be about 90 degrees.

In an embodiment the edges 24, 25, 26, 27 can extend substantially parallel to the line J extending through the relevant cell 19, 20. In an embodiment the second cells 20 can be smaller than the first cells 19. The first cells 19 can have a width B1 measured between the leading and trailing edge 24, 25 perpendicular to the relevant line J through the cell 19 larger than the width B2 of the second cells 20. In an embodiment the first cells 19 can be distributed such that when a one of the first cells 19 is positioned adjacent the outlet opening 10 of the slot 5, a following relevant first cell 19 is positioned adjacent the inlet opening 9 of the slot 5. A second cell 20 can be positioned in between, extending within the housing and/or in the slot. In an embodiment the depth X of each second cell 20 can be such that it is enclosed within the housing 2, except when passing the inlet opening 9 and/or the outlet opening 10.

A knife carrier 28 is provided near the periphery 21, within the housing 2. The knife carrier 28 can be positioned near the periphery 21 of the star wheel 4 and comprises at least one knife 31 that can be moved into and out of at least one of the second cells 20, for cutting tape, as will be discussed later on. Preferably the knife carrier 28 is at least partly operated by rotation of the star wheel 4.

The knife carrier 28 can, as is further elucidated in FIG. 9, be provided with a number of arms 29, extending from a central core 30, for example substantially radially. In an embodiment there can be four such arms 29. Each arm 29 can comprise a knife 31 with a cutting surface and/or teeth 32 extending substantially away from the core 30. The core 30 can be positioned on an axis 33 extending substantially parallel to the first axis 15. As can be seen especially in FIG. 9, each of the arms 29 can be provided with a first side 34 and a second side 35, the knifes 31 being provided between said sides 34, 35. Each of the first sides has a blade 36 that extends at least with a tip region 37 at a side 22 of the star wheel 4. Near the periphery 21 and adjacent a trailing edge 27 of a second cell 20 an operating element 38 is provided that extends from the side 22 of the star wheel 4. The element 38 can for example be a notch, pin, edge, rib or any other suitable element. As will be discussed later, the blade 36 can be brought into contact with the operating element 38, for operating the knife carrier 28.

As can be seen in FIG. 2 at one side of the slot 5 a first tape dispenser 3 is provided, comprising a roll of adhesive tape 39. A second tape dispenser 40 is provided, for holding a second role of tape 41. In an embodiment the first tape dispenser 3 can be provided at a side of the slot 5 opposite the side of the second tape dispenser 40. The second tape dispenser 40 can be provided at a side of the slot at which the knife carrier 28 is also provided. Sides to the slot should be understood as to the left or right of the line L as seen in a front or rear view of the apparatus 1. Near the knife carrier 28 a tautening device 42 is provided, preferably in the housing 2. The tautening device 42 comprises an arm 43, pivotally connected to the housing 2 in a pivot point 44. A side arm 45 is connected to the arm spaced apart from the pivot point 44, extending substantially in a direction away from the star wheel 4. The knife carrier 28 can be positioned substantially between the star wheel 4 and the arm 43. A spring 46 is connected between the housing 2 and the arm 43, biasing the arm towards the knife carrier 28. The second side 35 of the arms 29 is substantially in the same plane as the arm 43, such that, as is shown in FIGS. 2 and 5, at least one arm 29 is in contact with the arm 43 at all times. At the side arm 45 a pin 47 is provided, extending substantially parallel to the axis 15. At two opposite sides of the pin 47 the housing is provided with guide elements 48A, B.

From the first tape dispenser 3 adhesive tape 39 is fed over the periphery 21 of the star wheel 4, at least past a first cell 19 near or adjacent to the inlet opening 9 of the slot 5, an adhesive side 49 of the tape 39 extending outward, away from the star wheel 4. At the side of the slot 5 near the inlet opening 9, between the slot 5 and the arm 43, a guide 50 for the second tape 41 dispensed from the second tape dispenser 40 is provided, for guiding the second tape 41 towards the periphery 21 of the star wheel 4, at a position downstream from the inlet 9. The second tape 41 is preferably non adhesive tape, such as but not limited to paper tape. The second tape preferably is easily tearable, preferably more easily that the adhesive tape 39. The second tape is led from the second tape dispenser 40 over the sides of the guide elements 48A, B facing away from the star wheel 4 and over the side of the pin 47 facing the star wheel 4, and then through the guide 50 towards the periphery 21 of the star wheel 4, over which it is led in a downstream direction, towards the outlet opening 10, adhered to the adhesive tape 39.

As can be seen in for example FIGS. 2 and 5, the knife carrier 28 can be positioned in a rest position, in which the arm 43 is in contact with two arms 29 of the knife carrier 28. The spring 46 keeps the arm 43 in this position during rotation of the star wheel 4. In the position of FIG. 2 a bundle of products, such as the stems S of a bunch of flowers, schematically shown in cross section in FIG. 2 directly above the star wheel, in the inlet opening 9, can be pushed into the relevant first cell 19 adjacent the inlet opening 9, in the direction F, thereby pushing the tape 39 extending over the opening of the relevant first cell 19 into the cell 19, adhering at the same time to the stems S of the flowers and dispensing tape 39. By pushing the stems S further in the general direction F the star wheel 4 will be rotated in the direction W, leading the stems S through the slot 5 towards the outlet opening 10. Tape 39 will be dispensed from the first dispenser 3. Since the second tape 41 is adhered to the first tape 39 at the downstream side of the relevant first cell 19, tape 41 will also be dispensed from the second dispenser 40. The tape will be kept taut by the tautening device 42, also keeping the knife carrier 28 in the rest position. The first tape 39 and the second tape 41 adhered thereto will thus be extended over the second cell 20 following the relevant first cell 19.

When the star wheel 4 is rotated further in the direction W, the operating element 38 of a second cell 20 upstream adjacent the relevant first cell 19 in which the stems S extend is brought into contact with the tip region 37 of the side 36 of an arm 29 of the knife carrier 28 extending substantially into the direction of the slot 5 and inlet opening 9, as is shown in FIG. 6. The tip region 37 can be provided with a guide surface 51 which is curved. The guide surface 51 faces outward and is positioned such that upon further rotation of the star wheel 4 the operating element 38 is forced along the guide surface 51, pushing the arm 29 and especially the knife 31 into the second cell 20, bringing the knife carrier 28 and knife 31 in a working position, cutting the tapes 39 extending over the second cell 20. At the same time the arm 43 is pushed away from the star wheel 4, releasing to some extend the tension on the second tape 41 and allowing the knife carrier 28 to rotate further when the star wheel is rotated further in the direction W. This can bring the knife carrier back into a rest position. The stems S are thus enclosed between the first tape 39 extending to a high extend and preferably almost entirely around the bundle of stems S and the second tape 41 extending over a gap 52 between two parts of the first tape 39. This makes it easy to remove the tapes 39, 41 from the stems, by tearing one of the tapes, preferably the second tape 41 by pulling the two tabs 53A, B, formed on either side of the gap 52, apart.

The position of the knife carrier 28 along the periphery 21 relative to the inlet opening 9 and the relative positions of each first cell 19 and the adjacent upstream second cell 20 defined the length 54 of the tabs 53. Once the tapes 39, 41 have been cut by the knife 31, the star wheel 4 will rotate relative to the tapes, until the stems S are released form the cell 19 and a further bundle of stems S is introduced into the next first cell 19 then adjacent the inlet opening 9. by reducing the distance D between the cell 19 and the position in which the knife 31 cuts the tapes 39, 41 in the adjacent second cell 20 the tab length 54 can be limited, reducing use of tape and preventing excessive tab lengths, which is especially desirable when bundles of products have to be tied or sealed having a relatively large size in cross section.

FIGS. 3 and 4, 7 and 8 disclose an alternative embodiment of an apparatus according to the description, having the same or a similar star wheel 4, first and second tape dispensers 3, 40, knife carrier 28 and tautening device 42. In this embodiment the housing is divided basically in two parts 55, 56, the slot 5 extending between and being substantially defined by facing edges 57, 58 of the two parts 55, 56. A carrier 59 is provided, connecting the first and second part 55, 56. The carrier 59 is substantially U shaped, extending substantially perpendicular to the sides 12, 13 of the housing 2, having a central element 60 and two arms 61, connecting ends of the central element 60 with the first and second part 55, 56 respectively. The carrier therefore extends at a distance from the slot 5. In this embodiment the apparatus 1 can be mounted with the carrier on a working surface (not shown) such that a bundle of products such as flowers with stems S can be pushed from the slot 5 through the outlet opening 10 further in the direction of movement they had when passing through the slot 5.

In the description the embodiments are disclosed having the slot 5 or at least the line L extending substantially vertically. It is however obviously possible to have the slot extend in any desired direction and position, for example substantially horizontally or inclined relative to a horizontal and vertical plane.

In an embodiment the inlet opening 9 and first cell 19 can have corresponding widths. In another embodiment the width of the first cell 19 can differ from the inlet 9, for example smaller. The width B1 can for example be between 20 and 100 mm, for example between 30 and 80 mm. In an example the width B1 can be about 30 mm, about 40 mm or about 50 mm. The star wheel can have a diameter of any size, for example between 100 and 500 mm. In an example the star wheel can have a diameter of between 200 and 300 mm, for example about 240 to 250 mm. These sizes are only given by way of example. The star wheel 4 need not be circular. In an embodiment different star wheels 4 can be provided, interchangeable in the same housing. Different star wheels 4 can have for example but not limited to different positions of the first and second cells, different numbers of such cells, different sizes of first and/or second cells or combinations thereof, suitable for for example different sizes of bundles of products or bags or different products. Star wheels can have cells having for example a padding for protecting products from damage by the forces exerted thereon when being bundled, tied and/or sealed.

FIGS. 10-12 show a further embodiment of an apparatus 1, again comprising a housing 2, at least a first tape dispenser 3 and a star wheel 4. A slot 5 is again defined by the housing 2, extending between an inlet 9 and an outlet 10. As can be seen, especially in FIGS. 10 and 12, the star wheel 4 extends partly in the slot 5. Products fed through the slot 5 therefore have to engage the star wheel 4. In this embodiment the star wheel 4 is substantially the same as disclosed in the previous figures. However, in all embodiments star wheels 4 could be used having the first and second cells 19, 20 distributed differently, for example evenly spaced around the periphery, whereas the cells 19, 20 could all have the same sizes.

In this embodiment an urging device 62 is provided, at least partly upstream of the star wheel 4. A support surface 63 is provided at least on one side of the slot 5, for supporting products to be tied and/or a transport device fed over the support surface 63. Such transport device can for example be a substantially flexible conveyer 100, which can in embodiments have a relatively soft top side for supporting the products or parts thereof. As can be seen in for example FIG. 13, the support surface 63 can have a wavy portion 64 next to the star wheel 4, such that when the support surface 63 extends substantially horizontally a first part 65 of the transport surface 63 next to the star wheel 4 extends higher than an axis 15 of the star wheel 4 and two adjacent parts 66 of the supporting surface 63 extend on either side of the first part 65 at a lower level. The structure is preferably chosen such that when a first cell 19 is open to the inlet opening 9, an edge flush with the transport surface or transport element supported thereon, another first cell is open to the outlet in a similar manner, whereas the curvature of the wavy part is such that upon rotation of the star wheel to bring the relevant cell from the inlet side to the outlet side, a bottom portion 67 of the cell follows the wavy pattern of the first part 65, thus allowing support of the product or products by the supporting surface, directly or indirectly, during such movement.

As can be seen, in FIG. 12 especially, the urging device 62 can have a central portion 68, mounted on or formed by an axis of rotation 69, preferably extending substantially parallel to the axis 15 of the star wheel 4. In the embodiment shown the urging device comprises three pairs of protrusions or fingers 70, extending substantially tangential to the axis 69, at even angles τ of 120 degrees, between their length directions T. Of each pair the fingers 70 are spaced apart in the length direction 69L of the axis 69, such that of each pair the fingers extend on opposite sides of the star wheel 4, at least partly, as is especially clear from FIG. 11. The star wheel 4 and the urging device 62 have the same direction of rotation 71, in FIG. 12 counter-clockwise, and can both be driven by a motor. Each finger 70 has, seen in the direction of rotation 71, a forward side forming an edge portion 72 for urging products into a cell 19 of the star wheel. This edge portion can be substantially straight and substantially parallel to the length direction T of the finger 70. The opposite, trailing side 73 of the fingers 70 can extend at a slight angle relative to the length direction T and/or the edge portion 72, and there can be a bent transition position 74 between the edge portion 72 of one finger and the trailing side 73 of the an adjacent finger 70. As can be seen the edge portion 72 can be brought into a position in which it extends substantially parallel to and substantially at the same level as the adjacent support surface 63. In FIG. 12 this position is shown, wherein the adjacent finger preceding this finger 70 extends to a side of a cell 19 of the star wheel 4. Above the slot 5 near the urging device 62 a sensor 75 is mounted, such as for example an optical sensor, registering during use movement of products into the slot 5, over fingers 70 of the urging device 62.

Above the slot 5 furthermore a pressing device 76 can be mounted. In the embodiment shown the pressing device 76 comprises two substantially parallel arms 77, extending partly on opposite sides of the star wheel 4, above the fingers 70. The arms 77 are mounted on a common carrier 78, mounted on an axis of rotation 79 and biased in a downward direction P, for example by one or more springs 80 and/or gravity. As can be seen in FIG. 12 the arms 77 can rest on ends 81 of the fingers 70, such that a rotation of the urging device 62 will move the arms up and down, pivoting around the axis 79.

Preferably the urging device has a first number N1 of fingers or at least edge portions 73, whereas the star wheel has a second number N2 of first cells 19, wherein the first and second number N1, N2 are related by the formula N1=N*N2 or N2=N*N1, wherein N is an integer. In the embodiment shown N=1, resulting in the same number of cells 19 and fingers 70. N could also be a different number, for example but not limited to 2 or 3. When N=1 the revolutions of the star wheel 4 and the urging device 62 can be synchronised one to one.

In FIG. 12 a knife arrangement 82 is shown, above the star wheel 4. A first and second dispenser 3, 40 are shown, for dispensing adhesive tape 39 and paper 41 respectively, in the same or similar manner as discussed with respect to the previous figures. In this embodiment the adhesive tape 39 is fed over the periphery of the star wheel 4, the adhesive side facing outward, from substantially a lower side 84 of the star wheel 4. The paper or second tape 41 is fed from the second dispenser 40 over guide and tensioning wheels 86, 87, towards an upper side 85 of the star wheel 4.

The knife arrangement 82 can comprise a knife or blade 32, which can be movable in a linear direction K, substantially radial to the star wheel 4, into and out of a cell 20, for cutting the tape 39 or combined tapes 39, 41. The knife 32 can be moved by a pneumatic or hydraulic driver 88, or in another suitable way, such as but not limited to electrically or mechanically, for example coupled to the rotation of the star wheel 4.

In FIG. 13 in perspective view a device or apparatus 1 is shown, according to FIG. 10-12. Such device can be used as follows, referring also to the previous description of other embodiments.

A product or bundle of products 51, such as flowers, vegetables, rod like elements or the like, which may or may not be enclosed at least partly in a wrap or bag, can be fed into the slot 5 from the inlet 9, over a pair of fingers 70. In FIGS. 11 and 12 stems 90 of a bundle of flowers are shown as a bundle of products 51 to be tied. When the stems 90 are moved over the fingers 70, for example by a transport conveyer 100, extending over the support surface 63, and below the sensor 75, a control unit 91 will drive the star wheel 4 and the urging device 62 in the direction 71, such that the edge portion 72 will urge the stems 90 together and into the cell 19 of the star wheel 4, against the tape 39 extending over said cell 19. By rotating further the tape will be forced into the cell, together with the stems 90, as discussed before, whereas the arms 77 of the pressing device will come down and will be forced against the stems 90 on either side of the star wheel 4, urging the stems 90 down towards the bottom portion 67 thereof, keeping them together during tying. Then the star wheel 4 and urging device will be rotated further, such that (if applicable) paper or such tape 41 will be provided in an earlier described manner over part of the adhesive tape 39, forming a tie as discussed and shown in for example FIG. 2, in a position leaving the apparatus 1. The knife 32 will then be forced downward, into the relevant second cell 20, for cutting the tape 39 or combined tapes 39, 41, such that the tied stems 90 or at least products 51 can be removed when the star wheel is rotated further, such that the relevant cell 19 holding the stems 90 will be flush with the slot 5 again. For each bundle 51 to be tied the star wheel 4 and urging device 62 will be rotated over the same angle of approximately 120 degrees.

The knife arrangement 82 can be provided with a supporting roll 92, supported on a periphery of the star wheel 4. In an embodiment the knife 32 can be biased by the driver 88 into an extended position, such that the roll 92 is forced against the periphery and that the knife 32 will automatically be forced through the tape or tapes 39, 41 when the cell 20 arrives at the roll 92 which will then be forced into said cell 20, together with the knife 32. The driver 88 can then retract the knife and roll 92 after the cutting. Alternatively the knife 32 can be actively forced into the cell 20 by the driver 88, triggered by for example the control unit. Other means of operation are also possible, whereas a similar knife arrangement 82 could be used in the other embodiments, whereas other knifes and knife carriers, such as but not limited to the rotating knife carriers as described before could also be used in an apparatus according to FIG. 10-14.

By using the urging device 62 and/or the pressing device 76, and preferably both, the products can be brought into and/or held in a compact bundle during tying thereof.

It shall be clear that an urging device 62 and/or a pressing device 76 could also be used in the same or similar manner with embodiments of the apparatus 1 as discussed before.

In FIGS. 14A and B schematically two embodiment are shown of an apparatus 1, for example according to FIGS. 2 and 12 respectively, combined with a device 95 for feeding containers or other items 96 to the tape 39 between the first dispenser 3 and the slot 5. In the embodiment shown in FIG. 14A the device 95 comprises or is formed by a pick and place type robot 97, picking containers or items 96 from a supply and pushing the container or item 96 against the adhesive side of the tape 39 at a first cell 10, such that when released by the robot 97 the container or item 96 will rotate with the star wheel 4 towards the inlet side 9 of the slot. In FIG. 14B the device 95 comprises a movable table 98 below the star wheel 4, on which a container or item 96 is placed, for example by a transport element such as but not limited to a conveyer, or a robot. The table is then pushed up, for example pneumatically or hydraulically, electrically or mechanically, such that the container or item 96 is adhered to the adhesive side of the tape 39, preferably in a position at a first cell 19. Again, when the star wheel 4 is then rotated such that the said cell 19 comes flush with the slot, the item or container 96 will be facing the slot inlet side 9. Alternative solutions for attaching the containers or items 96 can be envisaged and will be directly clear to the person skilled in the art. For example the belt 99 supplying the items or containers 96 could be fed directly under the star wheel, such that the items or containers 96 are adhered to the tape 39 directly and lifted off the belt by rotation of the star wheel 4.

When in this embodiment a product or bundle of products 51, such as the stems 90 are forced into the relevant cell 19, pushing the tape 39 into the cell, the container or item 96 will be enclosed between the tape 39 and the product or bundle of products 51, such that it will be tied to the product or bundle 51 simultaneously. An example of a container or item 96 can be, but is not limited to a bag, sachet, flask, bottle, leaflet, gift or the like. When bundling flowers the item 96 can for example be a sachet containing nutrition or fertiliser. When packaging produce the item can for example be additives to be used with the produce, such as but not limited to herbs, spices or the like.

In the embodiments described and shown in the drawing, there is a first and a second dispenser 3, 40. However, in all embodiments it could be sufficient to have one tape dispenser only, especially the first dispenser for the adhesive tape.

At least one of the knife arrangement or knife carrier, the star wheel and the urging device and/or pressing device, and/or at least one dispenser 3, 40 could be connected to a counter, registering the number of revolutions or cutting actions during a period, which will be indicative for the number of products or bundles of products that have been tied during that period. This information can be read directly from the counter or could be transferred to another location, for example by wireless, sms or the like.

The invention is by no means limited to the embodiments shown and discussed here above. Many amendments and variations are possible within the scope of the invention. The star wheel can be driven differently, for example through a step motor engaging the axis 15 or by the feeding and/or discharging means. The knife carrier can be made differently, for example as an arm extending partly in the outlet opening 10, such that when the products are moved through the outlet opening the knife 31 is forced into a second cell 20, cutting loose the stems S. In stead of the star wheel 8 in the present form, rotatable around an axis 15, a star wheel can be in the form of an endless star belt, formed as a belt having a series of cells in an outwardly facing surface, guided over at least two end wheels, such that a series of cells 19, 20 is fed along the guide surface, allowing a series of bundles to be handled at the same time. Means can be provided to print information on and/or in the tape and/or the foil strip, such as sealing date, expiration date of the product, packing apparatus identification, advertisements or other information. In the embodiments shown the width of the strip of tape 39 is about the same as the width of the tape 41. These widths can be different, for example the second tape 41 can have a greater with in order to provide further information, such as user information, warranties and other communications. The urging means can be designed differently, for example moving substantially linearly. A transport belt of conveyer could be provided on both sides of the star wheel, or on only one side, and could be provided with elements for urging the products into a cell of the star wheel. The pressing device could also be designed differently, for example a flexible element extending alongside one or both of the sides of the star wheel, at an upper side of the cells 19 when opening towards the inlet 9 and/or outlet 10, for holding the products at a lower side 67 of the cell 19. These and other modifications, including all combinations and permutations of aspects and parts of the embodiments shown are supposed to have been disclosed here, both in isolation and in combination.

The invention claimed is:

1. An apparatus for sealing or tying products, comprising a housing with at least a first tape dispenser and a star wheel, a slot defined by or through the housing, wherein the star wheel extends at least partly in said slot, wherein the star wheel comprises a series of first cells and a series of second cells, the first and second cells being intermittently disposed in the star wheel, each cell being open to a periphery of the star wheel and two opposite sides thereof, wherein an urging device is provided having at least one edge portion for urging at least one product to be tied into one of the cells.

2. The apparatus according to claim 1, wherein the edge portion is part of a protrusion or finger of a wheel, rotatable such that said protrusion or finger can at least partly be rotated alongside the star wheel, past part of the cell into which the at least one product is urged.

3. The apparatus according to claim 1, wherein the urging device has at least a pair of edge portions, one edge portion of a pair on each opposite side of the star wheel, for urging at least one product into the cell on said two opposite sides.

4. The apparatus according to claim 2, wherein the protrusion or finger is provided on both sides of the star wheel.

5. The apparatus according to claim 1, wherein the urging device has a first number of edge portions or pairs of edge portions, distributed around a periphery of an axis or wheel, and the star wheel has a second number of first cells, wherein the first number is equal to n times the second number, wherein n is an integer.

6. The apparatus according to claim 1, wherein a pressing device is provided for pressing a product or set of products in a cell, away from the open side thereof.

7. The apparatus according to claim 6, wherein the pressing device has at least one arm extending along part of a side of the star wheel and biased in the direction of an axis of the star wheel.

8. The apparatus according to claim 6, wherein the pressing device is provided such that it is brought into and out of engagement with the at least one product in the relevant cell by movement of the urging device and/or the star wheel.

9. The apparatus according to claim 1, wherein a sensor is provided near the urging device, for controlling the urging device based on the movement of at least one product through a sensing area of the sensor.

10. The apparatus according to claim 1, wherein a reciprocal knife is provided alongside the periphery of the star wheel, for movement into and out of a cell of the star wheel, for cutting tape fed from the tape dispenser over said periphery.

11. The apparatus according to claim 1, wherein each of the first and second cell has a middle line extending radially through a center of the star wheel, wherein an angle between the middle line of a first cell and the middle line of a second cell at a first side of the first cell differs from an angle between the middle line of said second cell and the middle line of a further first cell adjacent to said second cell at an opposite second side thereof.

12. The apparatus according to claim 1, wherein the slot is provided with an inlet opening and an outlet opening, wherein the first cells are distributed over the star wheel such that when one first cell opens to the inlet opening of the slot, another first cell opens to the outlet opening of the slot, wherein a support surface extends alongside the star wheel and/or the slot, wherein the support surface has a wavy portion next to the star wheel, such that when the support surface extends substantially horizontally a first part of the support surface next to the star wheel extends higher than an axis of the star wheel and two adjacent parts of the support surface extend on either side of the first part at a lower level.

13. The apparatus according to claim 1, wherein said one cell is a first cell.

14. The apparatus according to claim 7, wherein the pressing device has a pair of arms extending along part of a side of the star wheel, extending along part of opposite sides of the star wheel, biased in the direction of an axis of the star wheel.

15. The apparatus according to claim 10, wherein the reciprocal knife is provided alongside the periphery of the star wheel, for movement into and out of a second cell of the star wheel, for cutting tape fed from the tape dispenser over said periphery.

16. The apparatus according to claim 10, wherein the knife is pneumatically driven.

17. The apparatus according to claim 1, wherein the second cells are smaller than the first cells.

18. An apparatus for sealing or tying products, comprising a housing with at least a first tape dispenser and a star wheel, a slot defined by or through the housing, wherein the star wheel extends at least partly in said slot, wherein the star wheel comprises a series of cells disposed in the star wheel, each cell being open to a periphery of the star wheel and two opposite sides thereof, wherein an urging device is provided having at least a pair of edge portions, one edge portion of a pair on each opposite side of the star wheel, for urging at least one product into the cell on said two opposite sides.

19. The apparatus for sealing or tying products, comprising a housing with at least a first tape dispenser and a star wheel, a slot defined by or through the housing, wherein the star wheel extends at least partly in said slot, wherein the star wheel comprises a series of cells disposed in the star wheel, each cell being open to a periphery of the star wheel and two opposite sides thereof, wherein an urging device is provided having at least one edge portion for urging at least one product to be tied into one of the cells, wherein the urging device has a first number of edge portions or pairs of edge portions, distributed around a periphery of an axis or wheel, and the star wheel has a second number of cells, wherein the first number of is equal to n times the second number, wherein n is an integer.

20. The apparatus for sealing or tying products, comprising a housing with at least a first tape dispenser and a star wheel, a slot defined by or through the housing, wherein the star wheel extends at least partly in said slot, wherein the star wheel comprises a series of first cells and a series of second cells, the first and second cells being intermittently disposed in the star wheel, each cell being open to a periphery of the star wheel and two opposite sides thereof, wherein an urging device is provided having at least one edge portion for urging at least one product to be tied into one of the cells, wherein the slot is provided with an inlet opening and an outlet opening, wherein the first cells are distributed over the star wheel such that when one first cell opens to the inlet opening of the slot, an other first cell opens to the outlet opening of the slot, wherein a support surface extends alongside the star wheel and/or the slot, which support surface has a wavy portion next to the star wheel, such that when the support surface extends substantially horizontally a first part of the support surface next to the star wheel extends higher than an axis of the star wheel and two adjacent parts of the support surface extend on either side of the first part at a lower level.

* * * * *